United States Patent Office 3,004,055
Patented Oct. 10, 1961

3,004,055
PROCESS FOR PREPARING O,O-DIALKYL, S-N-ALKYL-CARBAMYLMETHYL PHOSPHORODITHIOATES
Mario Perini and Giovanni Speroni, Milan, Italy, assignors to Montecatini Societa Generale per l'Industria Mineraria e Chimica, Milan, Italy
No Drawing. Filed Jan. 15, 1957, Ser. No. 634,181
5 Claims. (Cl. 260—461)

This invention relates to parasiticidal formulations containing, as active substances, alone or in mixture with other active substances, certain specific and selected N-alkylamides of O,O-dialkyldithiophosphorylacetic acids which we have found, by exhaustive research, to be exceptional among substances of the general class in having the combined properties of excellent parasiticidal activity and low toxicity to warm-blooded animals.

As is readily understandable, in order to be of practical utility, parasiticidal materials or compositions must have no or only very low toxicity to warm-blooded animals. This is particularly true when the composition is to be used to combat pests under conditions such that it comes into contact with food, such as fruit for instance, and there is danger that the food will be eaten while carrying a residue of the parasiticide.

N-alkylamides of O,O-dialkyl phosphorylacetic acids of the general formula (A) 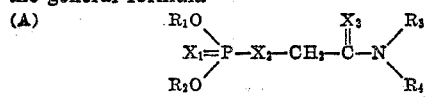

in which $R_1$ and $R_2$ are alkyl, aralkyl or aryl radicals, $R_3$ and $R_4$ represent hydrogen, alkyl, hydroxy alkyl, aryl or nitroaryl radicals and $X_1$, $X_2$ and $X_3$ are either sulfur or oxygen, have been put forward in the art as possessing, as a class, general pest-control characteristics.

Obviously, this formula embraces an enormous number of possible compounds. Actually we find, as a result of our intensive investigations of and actual practical tests with, a large number of different compounds embraced by the formula, that the compounds as a class do not possess general pest-control characteristics and that the vast majority of such compounds, even if active against some parasites, are so highly toxic to warm-blooded animals that they are unfit for incorporation in a generally useful parasiticidal composition.

Our investigations reveal, further, that the various substituents in the general formula given must be selected and specific, in order for the compound to have the desired parasiticidal activity coupled with low toxicity to warm-blooded animals.

Only three compounds embraced in the general formula have been found by us to have the required combination of properties; high parasiticidal activity and low toxicity to warm-blooded animals. These are the following substances;

(I) 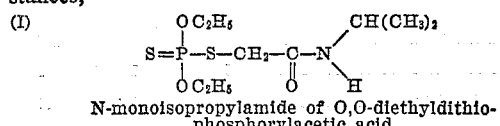
N-monoisopropylamide of O,O-diethyldithio-phosphorylacetic acid (II) 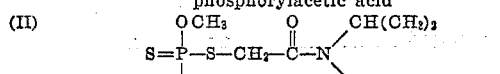
N-monoisopropylamide of O,O-dimethyldithio-phosphorylacetic acid (III) 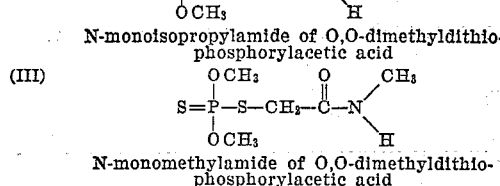
N-monomethylamide of O,O-dimethyldithio-phosphorylacetic acid It will be observed that, in these three compounds, the atom corresponding to $X_1$ in the general Formula A is a sulfur atom. This is extremely important because if such atom is an oxygen atom, then the toxicity of the compound to warm-blooded animals is markedly increased, without any corresponding increase in the parasiticidal activity, as proved by the following:

When the acute toxicity per os of our Compound I is made equal to 1.0 as determined on mice, the corresponding toxicity per os of the compound

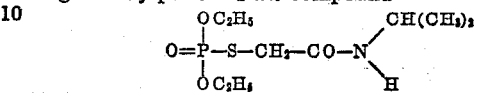

is found to be 2.5.

The character of the substituents $R_1$ and $R_2$ in Formula A also exerts an influence on the toxicity of the compounds. This is evident from Table I below in which the acute toxicities per os we have found for various other compounds included in the general formula (A) are compared with those of our selected and specific compounds, the N-isopropylamide and N-monomethylamide of O,O-dimethyldithiophosphorylacetic acid, the toxicity per os of the two last-mentioned compounds being taken as 1.0, for a standard of comparison.

TABLE I

| N-Amide | | Acute toxicity per os |
|---|---|---|
| $(OCH_3)_2-P(S)-S-CH_2-C(O)-N(C_3H_7(iso))H$ (II) N-isopropylamide of O,O-dimethyldithiophosphoryl acetic acid | | 1 |
| $(OCH_3)_2-P(S)-S-CH_2-C(O)-N(CH_3)CH_3$ | | 2.7 |
| $(OC_2H_5)_2-P(S)-S-CH_2-C(O)-N(CH_3)CH_3$ | | 11 |
| $(OC_2H_5)_2-P(S)-S-CH_2-C(O)-N(CH_3)H$ | | 9.6 |
| $(OC_2H_5)_2-P(O)-S-CH_2-C(O)-N(CH_3)CH_3$ | | 33 |
| $(OC_2H_5)_2-P(S)-S-CH_2-C(O)-N(C_3H_7(iso))H$ (I) | | 4.2 |
| $(OC_2H_5)_2-P(O)-S-CH_2-C(O)-N(C_3H_7(iso))H$ | | 10 |
| $(OCH_3)_2-P(O)-S-CH_2-C(O)-N(CH_3)H$ (III) N-monomethylamide of dimethyldithiophosphoryl acetic acid | | 1 |
| $(OC_2H_5)_2-P(S)-S-CH_2-C(O)-N(CH_3)H$ | | 5.75 |
| $(OC_2H_5)_2-P(O)-S-CH_2-C(O)-N(CH_3)H$ | | 12.9 |

TABLE I—Continued

| N-Amide | Acute toxicity per os |
|---|---|
| $(OC_2H_5)_2-\underset{\underset{S}{\|}}{P}-S-CH_2-\underset{\underset{O}{\|}}{C}-N\begin{smallmatrix}C_2H_5\\H\end{smallmatrix}$ | 2.4 |
| $(OC_2H_5)_2-\underset{\underset{O}{\|}}{P}-S-CH_2-\underset{\underset{O}{\|}}{C}-N\begin{smallmatrix}C_2H_5\\H\end{smallmatrix}$ | 4.2 |
| $(OCH_3)_2-\underset{\underset{O}{\|}}{P}-S-CH_2-\underset{\underset{O}{\|}}{C}-N\begin{smallmatrix}CH_3\\CH_3\end{smallmatrix}$ | 1.61 |

The fundamental influence of the substituents on the practical utility of the compounds, including that of oxygen linked to P, and the chemical nature and molecular structure of the substituents $R_3$ and $R_4$, is apparent from a consideration of the values given in Table I. Thus, it is seen that even the presence of two methyl groups on the N atom, instead of a single methyl group and a hydrogen atom, has the effect of increasing the per os toxicity of the compound. We have found, also, that if either $R_3$ or $R_4$ is an aromatic radical, or if both $R_3$ and $R_4$ are aromatic, the parasiticidal activity of the compound is practically nil.

Table II below gives the results of a second screening of the compounds and compares the activity of our specific compounds against some common parasites, and their toxicity, as determined on mice, with the activity and toxicity of other known compounds.

TABLE II

| Compound | Activity | | | | Acute toxicity | |
|---|---|---|---|---|---|---|
| | On flies | | On aphides (Aphis fabae) | On mites (Tetranychus telarius) | Per os | Endovenous |
| | Topical | Tarsal | | | | |
| Parathion (control) | 1 | 1 | 1 | 1 | 1 | 1 |
| 1. $(C_2H_5O)_2\underset{\underset{S}{\|}}{P}-S-CH_2-CONHC_3H_7(iso)$ | | | 1/3 | 5 | 1/2.4 | 1/2.7 |
| 2. $(CH_3O)_2\underset{\underset{S}{\|}}{P}-S-CH_2-CONH-CH_3$ | 1/3 | 1/4 | 1/4 | 1 | 1/5.9 | 1/9.6 |
| 3. $(CH_3O)_2\underset{\underset{S}{\|}}{P}-S-CH_2-CONHC_3H_7(iso)$ | 1/10 | 1/20 | 1.5 | 10 | 1/10 | 1/14 |
| 4. $(C_2H_5O)_2\underset{\underset{S}{\|}}{P}-O\!\!-\!\!\begin{smallmatrix}N=\\\\C_3H_7(iso)\end{smallmatrix}\!\!\begin{smallmatrix}CH_3\\\\N\end{smallmatrix}$ | 1/3 | 1/3 | | | 1/10.6 | 1/16.8 |
| 5. $[CH_3(CH_2)_3O]_2-\underset{\underset{S}{\|}}{P}SCH_2-CONH_2$ | <1/1,250 | 1/1,800 | 1/250 | 1/100 | 1/10.9 | 1/3.0 |
| 6. $(C_6H_5O)_2\underset{\underset{S}{\|}}{P}SCH_2CONH_2$ | <1/1,250 | <1/6,250 | 1/300 | 1/100 | 1/134 | 1/211 |
| 7. $(C_2H_5O)_2-\underset{\underset{S}{\|}}{P}SCH_2CONH\!\!-\!\!\bigcirc$ | <1/1,250 | <1/6,250 | 1/100 | 1/250 | 1/500 | 1/61 |
| 8. $(C_2H_5O)_2-\underset{\underset{S}{\|}}{P}SCH_2CH_2-CONH\!\!-\!\!\bigcirc$ | 1/1,000 | 1/1,800 | 1/250 | 1/400 | 1/140 | 1/44 |

Table III gives the biological activity to toxicity ratios found for the compounds shown in Table II.

TABLE III

| Compound | On flies | On aphides (Aphis fabae) | On mites (Tetranychus telarius) |
|---|---|---|---|
| Parathion (control) | 1 | 1 | 1 |
| 1. $(C_2H_5O)_2\underset{\underset{S}{\|}}{P}S-CH_2-CONHC_3H_7(iso)$ | | 0.8 | 12 |
| 2. $(CH_3O)_2\underset{\underset{S}{\|}}{P}-S-CH_2-CONH-CH_3$ | 1.5 | 1.5 | 6 |
| 3. $(CH_3O)_2\underset{\underset{S}{\|}}{P}-S-CH_2-CONH-C_3H_7(iso)$ | 0.5 | 15 | 100 |
| 4. $(C_2H_5O)_2\underset{\underset{S}{\|}}{P}-O\!\!-\!\!\begin{smallmatrix}N=\\\\C_3H_7(iso)\end{smallmatrix}\!\!\begin{smallmatrix}CH_3\\\\N\end{smallmatrix}$ | 3.5 | | |

TABLE III—Continued

| Compound | On flies | On aphides (Aphis fabae) | On mites (Tetranychus telarius) |
|---|---|---|---|
| 5. $[CH_3(CH_2)_3O]_2P(=S)-S-CH_2-CONH_2$ | 0.006 | 0.04 | 0.11 |
| 6. $(C_6H_5O)_2-P(=S)-S-CH_2-CONH_2$ | <0.021 | <0.45 | 1.34 |
| 7. $(C_2H_5O)_2-P(=S)-S-CH_2-CONH-C_6H_5$ | ~0.08 | >5 | >2 |
| 8. $(C_2H_5O)_2-P(=S)-S-CH_2-CH_2-CONH-C_6H_5$ | 0.08 | 0.56 | 0.35 |

It is obvious from the foregoing that our Compounds I–III are uniquely useful as parasiticides or in parasiticidal compositions under any conditions where low toxicity to warm-blooded animals is a criterion. Those compounds are in fact, excellent parasiticides, by which we mean they are substances or agents which actively control animal parasites such as, for example, Class of arachnids:
  Order of mites—
    Tetranychus telarius,
    Metatetranychus ulmi, etc.
Class of insects:
  Order—
    Dyptera: e.g., Musca domestica, Culex pipiens
    Hemiptera: e.g., Aphis fabae, Myzus persicae, Aphis pomi, Crysomphalus dictyospermi
    Coleoptera: e.g., Calandra granaria, Tenebrio molitor
    Orthoptera: e.g., Locusta migratoria-migratoioides
    Hymenoptera: e.g., Iridomyrmex humilis
    Lepidoptera: e.g., Cydia pomonella
    Beetles: e.g., Blatta orientalis We have found by actual test that formulations comprising, as active parasiticide, N-isopropylamides of O,O-dimethyl, and O,O-diethylphosphorylacetic acid, are not only effective for the control of various species of parasite including those belonging to the order listed above, but that such formulations exhibit special activity against all mites, in all stages of their biological cycle.

We have found, further, and by actual test, that the N-monomethylamide of O,O-dimethyldithiophosphorylacetic acid, besides having the same high general parasiticidal activity of the N-isopropylamides of O,O-dimethyl and O,O-diethyl-dithiophosphorylacetic acids, is especially active against Musca domestica and has a particularly low toxicity to warm-blooded animals, as is discussed and demonstrated more in detail hereinbelow.

The specific parasiticidal activity of our compounds is illustrated in the following tabulations of the results of our tests. In these tabulations, the compounds are designated I, II and III (see formulae above) for convenience.

*(1) Activity against Tetranychus telarius*

(a) By nebulizing a mixed population of mites in various stages of growth on bean plants under standardized conditions with an aqueous dispersion of Compounds I–III, the following average mortalities were observed, at the twenty-fourth hour:

TABLE IV.—SPECIFIC ACTIVITY AGAINST TETRANYCHUS TELARIUS

| Formulation based on compound | Concentration, percent active substance (A.S.) | Percent mortality | Percent mortality with equal doses of Parathion |
|---|---|---|---|
| I | 0.001 | 100 | 80 |
|   | 0.0005 | 95 | 35 |
|   | 0.00025 | 90 |  |
|   | 0.00010 | 65 |  |
| II | 0.001 | 100 | 80 |
|   | 0.0005 | 99 | 35 |
|   | 0.0001 | 90 |  |
|   | 0.02 | 100 |  |
| III | 0.004 | 99 |  |
|   | 0.001 | 90 | 80 |
|   | 0.0005 | 35 | 35 |

(b) By nebulizing mite eggs, the following average mortalities were obtained (as measured 5 days after treatment):

TABLE V.—ACTIVITY AGAINST EGGS OF TETRANYCHUS TELARIUS

| Formulation based on compound | Concentration, percent A.S. | Percent mortality |
|---|---|---|
| I | 0.125 | 100 |
|   | 0.062 | 90 |
|   | 0.031 | 50 |
| II | 0.125 | 100 |
|   | 0.062 | 75 |
|   | 0.031 | 10 |

(c) A test carried out on eggs of Tetranychus t. laid within 3 days on apple-tree leaves, which were subsequently sprayed under standardized conditions as hereunder indicated, gave the following results:

TABLE VI.—ACTIVITY AGAINST EGGS OF TETRANYCHUS TELARIUS

| Formulation based on compounds | Eggs not opened at concentrations of— | |
|---|---|---|
|  | 0.1% | 0.3% |
| I | 95 | 98.5 |
| II | 58 | 78 |
| III | 23 | 44 |

*(2) Activity against Aphis fabae*

By nebulizing a population of aphides, apterous virginoparous females, on bean plants under standardized conditions with suitably formulated aqueous dispersions of Compounds I–III, the following average mortalities were obtained after 24 hours:

*TABLE VII.—ACTIVITY AGAINST APHIS FABAE*

| Formulation based on compound | Concentration, percent A.S. | Percent mortality | Percent mortality with equal doses of Parathion |
|---|---|---|---|
| I | 0.005 | 100 | 99 |
|  | 0.004 | 100 | |
|  | 0.002 | 60 | |
|  | 0.001 | 25 | 65 |
| II | 0.005 | 100 | 99 |
|  | 0.004 | 100 | |
|  | 0.001 | 85 | 65 |
|  | 0.0005 | 10 | 5 |
| III | 0.01 | 100 | 100 |
|  | 0.005 | 90 | 99 |
|  | 0.004 | 75 | 90 |
|  | 0.001 | | 65 |

(3) *Activity against* Musca domestica (a) By topical application, by means of a microsyringe, of acetone solutions of Compounds I–III to five day old female flies, the following average percent mortalities were obtained after 20 hours:

TABLE VIII.—ACTIVITY AGAINST MUSCA DOMESTICA

[TOPICAL APPLICATION]

| Formulation based on compound | Gamma A.S. per fly | Percent mortality |
|---|---|---|
| I | 1 | 100 |
|  | 0.5 | 97 |
|  | 0.4 | 81 |
| II | 0.4 | 100 |
|  | 0.3 | 99 |
|  | 0.2 | 75 |
| III | 0.1 | 100 |
|  | 0.08 | 94 |
|  | 0.06 | 65 |
|  | 0.05 | 31 |

(b) On tarsal absorption, after removal of the solvent, by introducing five day old female flies into a beaker perviously treated with controlled amounts of benzene solutions of Compounds I–III, and leaving the flies in contact with these substances for 20 hours, the following mortalities were observed:

TABLE IX.—ACTIVITY AGAINST MUSCA DOMESTICA

[Tarsal absorption]

| Formulation based on compound | g.A.S./m.² | Percent mortality, 20 h. |
|---|---|---|
| I | 0.125 | 100 |
|  | 0.025 | 100 |
|  | 0.005 | 100 |
|  | 0.001 | 45 |
| II | 0.01 | 100 |
|  | 0.005 | 98 |
|  | 0.001 | 45 |
| III | 0.001 | 100 |
|  | 0.0005 | 95 |
|  | 0.0002 | 55 |
|  | 0.0001 | 10 |

(4) *Activity against* Acyrthosiphon onobrychis

By spraying under standardized conditions broad-bean plants infested by this kind of aphides with aqueous dispersions of Compounds II–III, the following results were obtained:

TABLE X.—ACTIVITY AGAINST *ACYRTHOSIPHON ONOBRYCHIS*

| Formulation based on compound | Concentration, p.p.m., A.S. | Percent mortality, 24 h. | $DL_{50}$, p.p.m., A.S. |
|---|---|---|---|
| II | 1.5 | 12.3 | 3 |
|  | 2.0 | 30.5 | |
|  | 2.5 | 39.0 | |
|  | 3.6 | 67.7 | |
|  | 4.6 | 73.4 | |
| III | 4 | 17.5 | |
|  | 8 | 49.5 | 8 |
|  | 15 | 77.4 | |
|  | 30 | 97.3 | |

(5) *Activity against* Drosophila melanogaster

The test was carried out by forming uniform deposits of the insecticides under examination through evaporation of the solvent of their solutions in Petri boxes. The results obtained by plotting the action lines for the compounds considered and for the comparison compounds are the following:

TABLE XI.—ACTIVITY AGAINST *DROSOPHILA MELANOGASTER*

| Formulation based on compound | $DL_{50}$ after 48 hrs. in γ | Relative activity (Parathion=1) |
|---|---|---|
| Parathion | 0.55 | 1 |
| Systox | 7.5 | 1/13.6 |
| II | 1.3 | 1/2.3 |
| III | 0.8 | 1/1.4 |

(6) *Activity against* Culex pipiens

By dipping the third-aged larvae of these insects in suitably formulated aqueous dispersions of Compounds II, III, the following average mortalities were obtained after 24 hours:

TABLE XII.—ACTIVITY AGAINST *CULEX PIPIENS*

| Formulation based on compound | A.S., p.p.m. | Percent mortality |
|---|---|---|
| II | 10 | 100 |
|  | 5 | 86 |
|  | 2 | 2 |
| III | 10 | 100 |
|  | 5 | 98 |
|  | 2 | 21 |

Moreover, substance I (N-monoisopropylamide of diethyldithiophosphorylacetic acid) has proved as extraordinarily effective against the following parasites:

TABLE XIII.—RESULTS OF FIELD TESTS

| Parasite | Concentration A.S. (p.p. thousand) | Percent mortality (after 26 hours) |
|---|---|---|
| *Paratetranychus pilosus* | 0.18 | [1]100 |
|  | 0.14 | [2]100 |
| *Heliothrips haemorroidalis* (on snow-ball-tree) | 0.1–0.2 | 100 |
| *Tingis pyri* (on apple-tree) | 0.1–0.2 | 100 |
| *Hyalopterous arundinis* (on peach-tree) | 0.16 | 95–100 |
| *Aphis pomi* (on apple-tree) | 0.2 | 100 |
| *Myrus cerasi* | 0.2 | 97 |

[1] Adults.  [2] Eggs.

*Determination of the acute toxicity* (to warm-blooded animals) *per os.*—The acute toxicity per os was determined by gastric sounding and by administration of solutions of the product considered in dimethylacetamide to white mice size 18/20 g. The interference of the solvent with the toxic phenomena is to be considered as negligible.

TABLE XIV.—ACUTE TOXICITY PER OS

| Compound | DL₅₀, mg./kg. | Corresponding dose of— | | |
|---|---|---|---|---|
| | | Parathion | $(C_2H_5O)_2P(=S)-O-$ 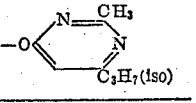 | |
| I | 19.54 | 8.2 | ---- | |
| II | 82.22 | 8.2 | 86.5 | |
| III | 48.98 | 8.2 | 86.5 | |

Our Compounds I–III can be prepared by the methods known for the preparation of S-substituted derivatives of O,O-dialkyl dithiophosphoric acids. For instance, the products can be formed by reacting an alkaline salt of the acid with an N-methyl-alpha-haloacetamide, in the presence of an organic solvent for the two reactants.

However, the products resulting from such reaction under the known conditions are impure. Since the purity of the product used as parasiticide is of extreme importance, inasmuch as the contaminating substances occuring therewith have poor activity against parasites, the products of the methods mentioned must be subjected to purifying after-treatments.

We have developed a special and improved method of preparing our Compounds I–III which results directly in pure products which do not require further purification steps. In accordance with our method, the reaction between the alkaline salt of the acid and the N-methyl-alpha-haloacetamide is carried out, at a temperature between 10° C. and 15° C., in water or in a mixture of water and of an organic solvent miscible therewith, including monohydric lower aliphatic alcohols such as methanol and ethanol, low molecular weight ketones including acetone, glycols, dioxane, etc.

The following examples illustrate our method for producing Compounds I–III, it being understood that these examples are not intended as limitative since mixtures of water with other water-miscible organic solvents can be used.

EXAMPLE 1

5 kg. of crude O,O-diethyldithiophosphoric acid are mixed with 5 liters of water, then 1250 g. of anhydrous $Na_2CO_3$ are added at a temperature not higher than 30° C., while stirring. Stirring is continued for half an hour, after which the solution is cooled to 10° C. The liquid is filtered and the oil layer is separated. The water solution of the sodium salt of diethyldithiophosphoric acid is now added rapidly, while cooling moderately to maintain the reaction mass at a temperature of about 10° C., to a mixture of 2900 g. N-isopropylchloroacetamide and 7 liters of water. Stirring is continued and the above temperature is maintained for 20 hours. The oily phase is then separated and shaken with a sodium bicarbonate solution if the pH is acidic, or with a carbon dioxide solution if the pH is alkaline, until pH 7 is reached. After separating it from water, the oil is now dried at 70–80° C. under vacuum. 4500 g. of monoisopropylamide of O,O-diethyldithiophosphorylacetic acid are thus obtained. The product comes as straw-colored crystals, melting point 23–24° C., boiling point 152–155° C. at 0.1–0.2 mm. Hg, insoluble in water and soluble in numerous organic solvents including monohydric aliphatic alcohols such as ethanol and methanol, aliphatic ethers such as ethyl ether, ketones, and aromatic hydrocarbons of low molecular weight such as benzene, toluene, etc.

If the process is carried out using an organic solvent, such as acetone, instead of water, the product comes as a brown-colored oil of low purity.

EXAMPLE 2

80 g. of crude O,O-dimethyldithiophosphoric acid in 135 cc. water are neutralized to pH 7 with about 31 g. potassium carbonate. The mixture is filtered and the solids collected are washed twice with 70 cc. water in total. The oil drops which settle in the filtrate are separated. The oily phase is discarded. The aqueous solution is transferred to a flask with 3 necks, provided with a good stirrer, and a solution of 38 g. monoisopropylchloroacetamide in 35 cc. acetone is added while stirring. The mass is stirred at 15° C. for at least 20 hours, then the flask is connected to a water jet suction pump and heated to 30° C. The mixture is kept at 30° C. under the maximum vacuum permitted by the apparatus (30–40 mm. Hg) for about half an hour. Then it is cooled at about 5° C. for one hour and filtered by suction; the crystals collected are washed on the filter with a small amount of water.

By collecting also the crystals which separate from the mother liquors after 3 or 4 days, 60 g. of monoisopropylamide of O,O-dimethyldithiophosphorylacetic acid are obtained.

The N-monoisopropylamide of O,O-dimethyldithiophosphorylacetic acid is in the form of crystals which are slightly yellow colored or colorless in the pure state, melt at 72–73° C., and are insoluble in water and propylene glycol, soluble in primary aliphatic alcohols and in ketones, scarcely soluble in ether, and soluble in dimethylacetamide.

If the process is carried out using only acetone, instead of the water-acetone mixture, a mixture of oily, impure substance and crystals is obtained.

EXAMPLE 3

80 g. of crude O,O-dimethyldithiophosphoric acid in 135 cc. of water are neutralized to pH 7 with about 31 g. potassium carbonate. The mixture is filtered and the filter is washed twice with a total of 70 cc. water. The oil drops which settle in the filtrate are separated; the oily phase is discarded. The aqueous solution is transferred to a flask with 3 necks, provided with a good stirrer, and 30.5 g. N-monomethylchloroacetamide in about 30 cc. acetone are added. The mass is stirred at 15° C. for at least 20 hours, then the flask is connected to a water jet suction pump and heated to 30° C. The mixture is kept at 30° C. under a vacuum of 30–40 mm. Hg for about half an hour. Then, the reaction mass is cooled and dipped into about 250 cc. of cold water. The oily phase is separated and shaken with a sodium bicarbonate solution if the final pH is acidic, or with a carbon dioxide solution if the pH is alkaline, till pH 7 is reached. Finally, the mixture is allowed to separate completely and the oil obtained is clarified by filtration through pleated filters and dried under vacuum at 70–80° C. 45–48 g. of monomethylamide of O,O-dimethyldithiophosphorylacetic acid are thus obtained, as a straw colored oil having a specific gravity at 30° C. $d_4^{30}=1.265$ and a refractive index $n_D^{30}=1.53$. This product is insoluble in water and propylene glycol and soluble in primary aliphatic alcohols, ketones, ethyl ether, and dimethylacetamide. By cooling partial crystallization takes place.

EXAMPLE 4

178 g. of crude O,O-dimethyldithiophosphoric acid suspended in 170 cc. of water are neutralized with 54 g. sodium carbonate. The mixture is filtered and the filter is washed twice with a little water. The oil drops which settle in the filtrate are separated and discarded. The aqueous solution is transferred to a flask with 3 necks, provided with stirrer, and 70 g. of N-monomethylchloroacetamide in about 470 cc. water are added. The mass is stirred at 15° C. for at least 36 hours, then 85 g. sodium chloride are added. After stirring for another 8 hours, the mass is agitated for 1 hour with 60 cc. carbon tetrachloride. The oil layer is then separated, washed with 50 cc. water, neutralized with sodium bicarbonate to pH 7 and finally distilled under vacuum at a temperature not higher than 50° C.

100 g. of monomethylamide of O,O-dimethyldithiophosphorylacetic acid are thus obtained, in the form of an oil, which by cooling to below 20° C. crystallizes almost completely. The solidification temperature of the mass is 22-23° C.

If the process is carried out using acetone, instead of water, as a solvent, the product comes as a brown oil of low purity.

It will be apparent from the data presented that the present invention, based upon the discovery and recognition of the relationship of the specific chemical structure of compounds embraced by Formula A and the capacity of the compounds to control parasites while exhibiting low toxic effects on warm-blooded animals, is an extremely valuable contribution to this art. Our Compounds I–III may be used in parasiticidal compositions under conditions for which the use of parasiticides that are toxic to warm-blooded animals is prohibited.

Some changes may be made in practicing our invention, such as changes in the conditions for making our compounds, without departing from our invention. It is to be understood, therefore, that we intend to claim as part of our invention any variations, substitutions and changes that lie within the scope of our invention and of the appended claims, and intend to include within the scope of said claims such changes as may be apparent to those skilled in the art in the practice of the principles of our invention as set forth in this specification.

What is claimed is:

1. In the production of a compound selected from the group consisting of N-monoisopropylamide of O,O-diethyldithiophosphorylacetic acid, N-monoisopropylamide of O,O-dimethyldithiophosphorylacetic acid, and N-monomethylamide of O,O-dimethyldithiophosphorylacetic acid by reaction between an alkali salt of the correspondingly dialkylated dithiophosphoric acid and the correspondingly N-alkylated-alpha-haloacetamide, the improvement which comprises producing the compound directly in a pure, light-colored to substantially colorless state in which it exhibits pronounced parasiticidal activity coupled with low toxicity to warm-blooded animals without requiring purifying after-treatments, by carrying out said reaction, at a temperature between 10° C. and 15° C., in water.

2. In the production of a compound selected from the group consisting of N-monoisopropylamide of O,O-diethyldithiophosphorylacetic acid, N-monoisopropylamide of O,O-dimethyldithiophosphorylacetic acid, and N-monomethylamide of O,O-dimethyldithiophosphorylacetic acid by reaction between an alkali salt of the correspondingly dialkylated dithiophosphoric acid and the correspondingly N-alkylated-alpha-haloacetamide, the improvement which comprises producing the compound directly in a pure, light-colored to substantially colorless state in which it exhibits pronounced parasiticidal activity coupled with low toxicity to warm-blooded animals without requiring purifying after-treatments, by carrying out said reaction, at a temperature between 10° C. and 15° C., in a mixture of water and a water miscible organic solvent.

3. The method according to claim 2, characterized in that the organic solvent is a lower aliphatic alcohol.

4. The method according to claim 2, characterized in that the organic solvent is a lower aliphatic ketone.

5. The method according to claim 2, characterized in that the organic solvent is dioxane.

References Cited in the file of this patent

UNITED STATES PATENTS

| | | |
|---|---|---|
| 2,266,514 | Romieux et al. | Dec. 16, 1941 |
| 2,494,283 | Cassidy et al. | Jan. 10, 1950 |
| 2,627,523 | Hook et al. | Feb. 3, 1953 |
| 2,645,657 | Rudel et al. | July 14, 1953 |
| 2,759,010 | Lorenz et al. | Aug. 14, 1956 |
| 2,815,312 | Schuler | Dec. 3, 1957 |
| 2,841,517 | Boon et al. | July 1, 1958 |
| 2,861,912 | Sallmann | Nov. 25, 1958 |
| 2,890,947 | Annable | June 16, 1959 |

OTHER REFERENCES

Pellegrini: "Itali. Agr.," vol. 92, No. 11, pp. 747–754 (November 1955).

De Pietri-Tonelli: "Ital. Agr." (Soc. Monecatini, Signa Florence, Italy), vol. 93, No. 1, pages 49–56 (January 1956) (in Italian).